United States Patent [19]

Fricke et al.

[11] Patent Number: 4,782,106

[45] Date of Patent: Nov. 1, 1988

[54] RUBBER ADHESIVE MIXTURE CONTAINING CA(OH)2 FOR DIRECT BONDING TO GLASS OR METALLIC ARTICLES

[75] Inventors: Gerhard Fricke, Lohberg; Holger Hoffmann, Hanover; Henning Umland, Luhe, all of Fed. Rep. of Germany

[73] Assignee: Continental Aktiengesellschaft, Hanover, Fed. Rep. of Germany

[21] Appl. No.: 922,696

[22] Filed: Oct. 24, 1986

[30] Foreign Application Priority Data

Nov. 2, 1985 [DE] Fed. Rep. of Germany ....... 3538975

[51] Int. Cl.$^4$ .......................... C08K 3/10; C08K 3/34; C08L 7/00; C08L 21/00
[52] U.S. Cl. .................................. 524/413; 524/426; 524/430; 524/433; 524/436; 524/456; 524/504; 524/505; 524/508
[58] Field of Search ............... 524/430, 433, 504, 505, 524/508, 436, 413, 456, 426

[56] References Cited

U.S. PATENT DOCUMENTS

| | | | |
|---|---|---|---|
| 3,943,079 | 3/1976 | Hamed | 524/13 |
| 3,953,223 | 4/1976 | Doran et al. | 523/216 |
| 3,957,718 | 5/1976 | Pochert et al. | 524/723 |
| 4,306,930 | 12/1981 | Cowell et al. | 526/335 |
| 4,383,072 | 5/1983 | Thiel et al. | 524/511 |
| 4,476,277 | 10/1984 | Koyama et al. | 524/509 |
| 4,595,442 | 6/1986 | Trares et al. | 156/289 |

OTHER PUBLICATIONS

Derwent 82-137331 (J57137331) 8-1982 Bando Chem.
Derwent 83-020433 J58020433 Meiji Gomme 2-1983, Fujii.
Derwent 83-720384/30 (J58103555) Aug. 1983 Osaka.
Derwent 83-770202/38 (SU 975736) Sep. 1983 Dwepr.
Derwent 78-50889A/28 Jun. 1978 (J53064237) Toyo Ink.

Primary Examiner—Herbert J. Lilling
Attorney, Agent, or Firm—Becker & Becker, Inc.

[57] ABSTRACT

A colored or carbon-black-loaded rubber adhesive mixture that has a natural and/or synthetic rubber base, and that is intended for direct bonding to glass or metallic articles. The adhesive mixture contains: filler comprising 20 to 100 parts by weight relative to 100 parts by weight rubber, activator, plasticizer, vulcanizing agent, an adhesive system having a resorcinol/hexamethylenetetramine base, and an inorganic base.

10 Claims, No Drawings

RUBBER ADHESIVE MIXTURE CONTAINING CA(OH)2 FOR DIRECT BONDING TO GLASS OR METALLIC ARTICLES

BACKGROUND OF THE INVENTION

1. Field of the Invention

The present invention relates to a colored or carbon-black-loaded rubber adhesive mixture that has a natural and/or synthetic rubber base, and that is intended for direct bonding to glass or metallic articles. The mixture contains filler activators, plasticizers, a vulcanizing agent, and an adhesive system having a resorcinol/hexamethylenetetramine base.

2. Description of the Prior Art

Carbon-black-loaded rubber adhesive mixtures for direct bonding to metals are known that use an adhesive system of resorcinol/hexamethylenetetramine. Relatively large additions of resorcinol and hexamethylenetetramine make it possible, with these known mixtures, to achieve good adhesion to various metallic surfaces. However, up to now it has not been possible to provide a colored universal adhesive mixture for adhesion to various metals.

It is therefore an object of the present invention to provide a rubber adhesive mixture for direct bonding to various metallic articles, whereby this mixture can also be in the form of a colored rubber mixture, and with which mixture excellent adhesion values can be achieved.

This object, and other objects and advantages of the present invention, will appear more clearly from the following specification and tabular example.

SUMMARY OF THE INVENTION

The aforementioned object is inventively realized in that the rubber adhesive mixture contains, as a further constituent, an inorganic base, and in that the fillers, which in the case of a colored rubber adhesive mixture comprise metallic oxides and/or silicates and/or carbonates, are present in an amount equal to 20 to 100 parts by weight relative to 100 parts by weight rubber.

The present invention offers the advantage of high adhesion values for a rubber-metal adhesion on surfaces of brass, zinc, and bare or polished steel, and in particular not only for carbon-black-loaded rubber adhesive mixtures, but also for colored rubber adhesive mixtures. In connection with the present invention, colored rubber adhesive mixtures is intended to mean all adhesive mixtures that are either provided with a pigment, or are in the form of a light adhesive mixture.

It should also be noted that a further decisive advantage of the present invention is that rubber adhesive mixtures can also be achieved that provide a superior adhesion to glass.

The good adhesion values obtained with the inventive rubber adhesive mixture are primarily achieved by adding an inorganic base to the known adhesive system of resorcinol and hexamethylenetetramine. Calcium hydroxide is particularly suitable as the inorganic base, and in particular in quantities of from 1 to 5 parts by weight relative to 100 parts by weight rubber. the calcium hydroxide is distinguished by a favorable blending characteristic and a good distribution in the rubber mixture.

Particularly good results are achieved if sulfenamides, such as dicyclohexylbenzothiazolesulfenamide, are used as an accelerator or a catalyst.

The rubber adhesive mixtures can be composed of natural rubber, synthetic rubbers, as well as blends of natural and synthetic rubbers. However, the amount of natural rubber should be 50% or more.

When colored rubber adhesive mixtures are produced, it is sufficient to use 1 to 3 parts by weight resorcinol and 1 to 2 parts by weight hexamethylenetetramine, thus resulting in a reduction of the quantity of these materials that are used relative to heretofore known rubber adhesive mixtures, and also resulting in a more economical mixture. For light and colored rubber adhesive mixtures, metal oxides and/or silicates and/or carbonates can be used as reinforcing fillers. It is particularly advantageous to use titanium dioxide as filler, whereas a customary quantity of zinc oxide suffices as activator.

The present invention can also be used with carbon-black-loaded rubber adhesive mixtures, whereby the adhesive system comprises 1 to 6 parts by weight resorcinol and 1 to 4 parts by weight hexamethylenetetramine. Such a mixture can also contain, as filler, 40 to 80 parts by weight carbon black relative to 100 parts by weight rubber.

Good adhesion values are also obtained with a mixture that contains exclusively natural rubber, and where 40 to 60 parts by weight carbon black are blended with 30 to 10 parts by weight of a light filler, for example calcium silicate.

Best modes for Carrying Out the Invention

Five inventive rubber adhesive mixtures are listed in a subsequent table. All five of these mixtures have good adhesion values on metals and on glass. The first three mixtures are in the form of colored rubber adhesive mixtures, whereas the last two mixtures are predominantly or completely carbon-black-loaded adhesive mixtures.

To check the adhesion, samples in the form of 6 mm—thick rubber sheets were produced from the individual mixtures, with wires, metal plates, and glass being vulcanized onto and in the mixtures. The metallic or glass articles were subsequently forcefully pulled out. Due to the high tensile forces, and the existing rubber covering, very positive adhesion values could be concluded.

TABLE

| | Sample No. | | | | |
|---|---|---|---|---|---|
| | 1 | 2 | 3 | 4 | 5 |
| | Parts by weight | | | | |
| Natural rubber | 100 | 50 | 50 | 100 | 100 |
| Polybutadiene | — | 50 | — | — | — |
| Nitrile rubber | — | — | 50 | — | — |
| Titanium dioxide | 60 | 60 | 60 | — | — |
| Calcium silicate | — | — | — | 15 | — |
| Carbon black | — | — | — | 45 | 50 |
| Zinc oxide | 8 | 8 | 8 | 8 | 8 |
| Organic pigment | 5 | 5 | 5 | — | — |
| Plasticizing oil | 20 | 20 | 20 | 5 | 5 |
| Antioxidant (ASM) | 1 | — | — | 1 | 1 |
| Adhesive resin | — | — | — | 1 | 1 |
| Sulfur | 3 | 3 | 3 | 3 | 3 |
| Hexamethylenetetramine | 1.5 | 1.5 | 1.5 | 3 | 3 |
| Resorcinol | 2.5 | 2.5 | 2.5 | 5 | 5 |
| Accelerator (DCBS) | 1.5 | 1.5 | 1.5 | 2 | 2 |
| Calcium | 2.5 | 2.5 | 2.5 | 2.5 | 2.5 |

TABLE-continued

| | Sample No. | | | | |
|---|---|---|---|---|---|
| | 1 | 2 | 3 | 4 | 5 |
| | | | Parts by weight | | |
| hydroxide | | | | | |

The present invention is, of course, in no way restricted to the specific disclosure of the specification and example, but also encompasses any modifications within the scope of the appended claims.

What we claim is:

1. In a rubber adhesive mixture of a bonding system that has components including a natural and/or synthetic rubber base, and that is intended for direct bonding to glass or metallic articles, said mixture containing:
   filler consisting of 20 to 100 parts by weight relative to 100 parts by weight rubber;
   activator;
   plasticizer;
   vulcanizing agent;
   an adhesive system having a resorcinol/hexamethylenetetramine base; and the improvement therewith which comprises:
   calcium hydroxide as an inorganic base also contained as a further component of the bonding system in the rubber adhesive mixture to obtain good adhesion values for direct bonding to glass or metallic articles.

2. A mixture according to claim 1, which incudes 1 to 5 parts by weight calcium hydroxide per 100 parts by weight rubber.

3. A mixture according to claim 1, which further includes 1 to 3 parts by weight sulfenamide accelerator.

4. A mixture according to claim 1, which includes at least 50% natural rubber.

5. A mixture according to claim 1, which is a colored mixture, and in which said filler is selected from at least one of the group consisting of metallic oxides, silicates, and carbonates.

6. A mixture according to claim 1, which is a colored mixture, and in which said adhesive system comprises 1 to 3 parts by weight resorcinol and 1 to 2 parts by weight hexamethylenetetramine.

7. A mixture according to claim 6, which includes titanium dioxide as light filler.

8. A mixture according to claim 1, which is a carbon-black-loaded mixture, and includes 1 to 6 parts by weight resorcinol and 1 to 4 parts by weight hexamethylenetetramine, relative to 100 parts by weight rubber.

9. A mixture according to claim 8, which includes 40 to 80 parts by weight carbon black, as filler, per 100 parts by weight rubber.

10. A mixture according to claim 9, which, per 100 parts by weight rubber, contains 40 to 60 parts by weight carbon black as filler, and 30 to 10 parts by weight of a lighter filler

* * * * *